United States Patent [19]
Ueno

[11] Patent Number: 5,910,881
[45] Date of Patent: Jun. 8, 1999

[54] MULTILAYERED ELECTRONIC ELEMENT

[75] Inventor: Yasushi Ueno, Takefu, Japan

[73] Assignee: Murata Manufacturing Co., Ltd., Japan

[21] Appl. No.: 08/874,560

[22] Filed: Jun. 13, 1997

[30] Foreign Application Priority Data

Jun. 14, 1996 [JP] Japan ................................. 8-154211

[51] Int. Cl.$^6$ ................................................ H01G 4/06
[52] U.S. Cl. ................. 361/313; 361/321.2; 361/321.4; 361/321.5; 29/29.42
[58] Field of Search ................................ 361/303–305, 361/311–313, 321.1–321.5, 306.3; 29/25.42

[56] References Cited

U.S. PATENT DOCUMENTS

| | | |
|---|---|---|
| 4,135,224 | 1/1979 | Maher ................................. 361/321 |
| 4,612,600 | 9/1986 | Hodgkins ................................. 361/321 |
| 5,065,274 | 11/1991 | Berghout et al. ....................... 361/321 |
| 5,097,391 | 3/1992 | Nomura et al. ......................... 361/321 |

*Primary Examiner*—Kristine Kincaid
*Assistant Examiner*—Anthony Dinkins
*Attorney, Agent, or Firm*—Ostrolenk, Faber, Gerb & Soffen, LLP

[57] ABSTRACT

A highly reliable multilayered electronic element which changes little with temperature in electrostatic capacitance. A multilayered capacitor is made up of a dielectric ceramic body of barium titanate and opposing internal electrodes of nickel which form capacitance. Nickel diffuses over a controlled distance ($L_2$) which is 3–30% of the interval ($L_1$) between the internal electrodes. The distance of diffusion varies depending on the conditions of firing (such as temperature, duration, and atmosphere).

18 Claims, 1 Drawing Sheet

MULTILAYERED ELECTRONIC ELEMENT

BACKGROUND OF THE INVENTION

1. Field of the Invention

The present invention relates to a multilayered electronic element and, more particularly, to a multilayered electronic element having a plurality of opposing internal electrodes arranged in a ceramic body.

2. Description of the Prior Art

There is a growing trend in multilayered electronic elements toward reducing their size and increasing their capacitance by the use of thinner and multilayered internal electrodes and ceramic sheets. One of the conventional multilayered electronic elements is the multilayered capacitor composed of ceramic sheets of barium titanate and internal electrodes of noble metal (such as Pt, Pd, and Ag/Pd). For cost savings, internal electrodes of noble metal are being replaced by those of base metal such as Ni and Cu.

The disadvantage of internal electrodes of base metal is that base metal partly diffuses into the ceramics body to form oxides therein. Since the distance of diffusion is less than 3% of the interval between the internal electrodes, diffusion has no effect at all so long as the ceramics layer between internal electrodes is comparatively thick. However, in the case where the ceramics layer is thinner than about 10 μm, diffusion poses a problem in that it causes a decrease in insulation resistance and variations in capacitance and temperature characteristics. This problem has not been solved yet because it is difficult to control the effect of diffusion which manifests itself within 3% of the interval between internal electrodes.

OBJECT AND SUMMARY OF THE INVENTION

The present invention is able to provide a highly reliable multilayered electronic element which is free from the undesirable effects of diffusion of the material of the internal electrodes into the ceramics layers and whose electrostatic capacitance hardly changes with temperature.

The multilayered electronic element of the present invention has the base metal of the internal electrodes diffused in the ceramic body, with the distance of diffusion being 3 to 30% of the interval between the internal electrodes. Specifying the distance of diffusion as above makes it possible to control the change of electrostatic capacitance with temperature.

DESCRIPTION OF AN EMBODIMENT OF THE INVENTION

The present invention, which is embodied in a multilayered ceramic capacitor, will be described in more detail with reference to the accompanying drawing.

Figure 1:
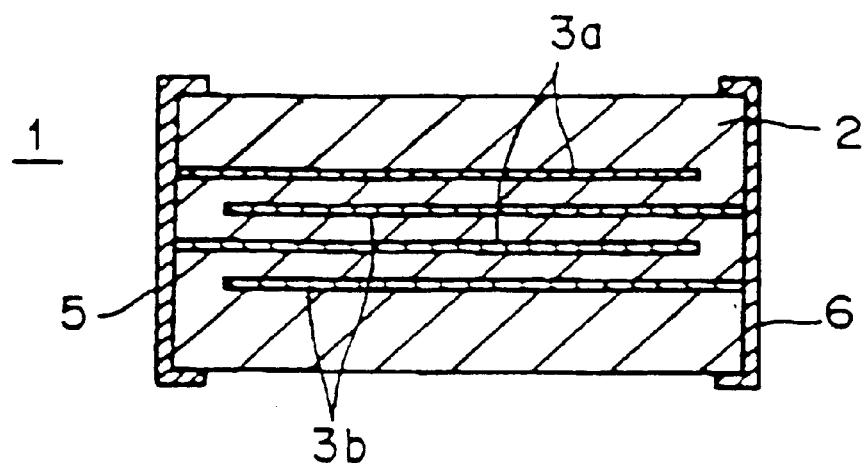
FIG. 1 is a sectional view showing a multilayered ceramic capacitor which is an embodiment of the present invention.

FIG. 1 shows in section the multilayered ceramic capacitor 1, which is made up of a dielectric ceramic body 2 and opposing internal electrodes 3a, 3b which form a capacitance between them for storing an electrical charge. On the left end of the capacitor 1 is an external electrode 5 electrically connected to the internal electrodes 3a. On the right end of the capacitor 1 is an external electrode 6 electrically connected to the internal electrodes 3b.

The capacitor 1 is produced in the following manner. First, a dielectric ceramic powder of barium titanate is mixed with a binder, and other conventional additives, and the resulting mixture is formed into a green sheet (about 12 μm thick) by the doctor blade process. On the green sheet is formed the internal electrodes 3a, 3b by printing an electrically conductive paste composed of nickel powder and an organic vehicle. The green sheets (carrying the internal electrodes 3a, 3b thereon) are placed on top of each other, and the resulting assembly is sandwiched between upper and lower protective layers (dielectric ceramic sheets). The resulting laminate undergoes degreasing in the atmosphere and firing at a high temperature. Firing causes nickel (constituting the internal electrodes 3a, 3b) to partly diffuse into the dielectric ceramic body 2. The distance of diffusion varies depending on the temperature, duration, and atmosphere of firing.

In Examples 1 to 8, the distance of diffusion was controlled by adjusting the duration of firing at the maximum temperature as shown in Table 1. The distance of nickel diffusion was measured by Auger electron spectroscopy.

TABLE 1

|  | Duration of firing (h) | Interval between electrodes, $L_1$ (μm) | Distance of nickel diffusion, $L_2$ (μm) | $L_2/L_1 \times 100$ (%) |
|---|---|---|---|---|
| Example 1 | 1.0 | 10.3 | 0.3 | 3 |
| Example 2 | 2.0 | 9.8 | 0.5 | 5 |
| Example 3 | 3.0 | 9.6 | 0.7 | 7 |
| Example 4 | 5.0 | 9.5 | 1.1 | 12 |
| Example 5 | 10.0 | 9.5 | 1.8 | 19 |
| Example 6 | 15.0 | 9.3 | 2.2 | 24 |
| Example 7 | 20.0 | 9.1 | 2.8 | 31 |
| Example 8 | 30.0 | 9.1 | 3.2 | 35 |
| Comparative Example | 2.0 | 50.0 | 0.1 | 0.2 |

Figure 2:
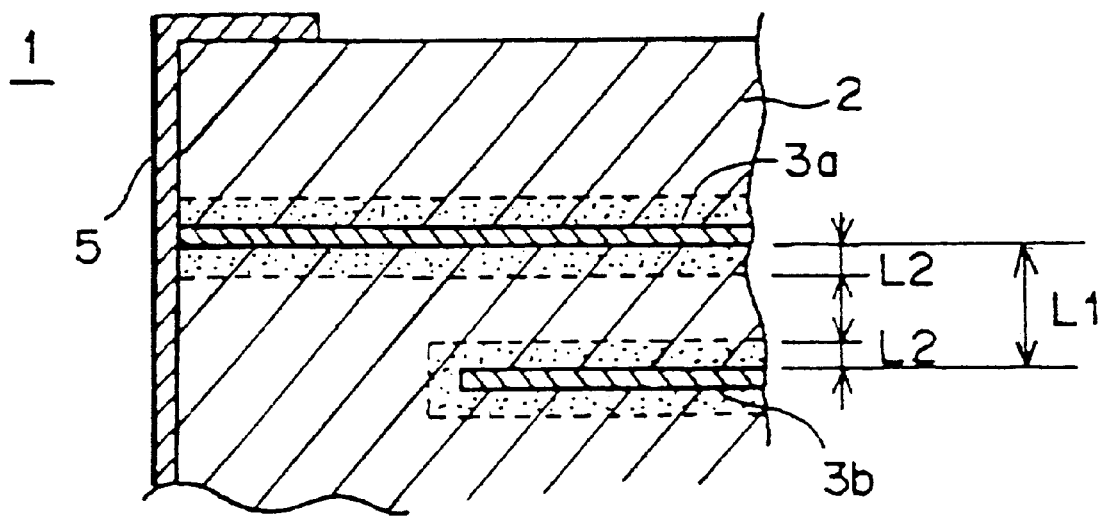
FIG. 2 is a partly enlarged sectional view of the multilayer ceramic capacitor shown in FIG. 1.

The samples were prepared and it was found that the distance ($L_2$) of nickel diffusion is 3 to 35% of the interval ($L_1$) between the internal electrodes, as shown in FIG. 2. The Comparative Example sample in Table 1 was formed from green sheets, with nickel electrodes attached to the upper and lower surfaces of the laminate. Each sample was provided on both ends with external electrodes 5, 6 which were formed from a silver paste by coating and firing.

The thus obtained capacitor was tested for the rate of change with temperature in electrostatic capacitance, insulation resistance (IR), dielectric breakdown voltage (BDV), and high-temperature load test. The results are shown in Table 2.

TABLE 2

| Example | Rate of change with temperature in electrostatic capacitance [n = 10] | | | log IR | BDV (V) [n = 100] | High-temperature load test [n = 200] | Overall rating |
|---|---|---|---|---|---|---|---|
| | ΔC-55/C25 (%) | ΔC-125/C25 (%) | \|ΔC/C25\|$_{max}$ (%) | | | | |
| Example 1 | −0.8 | −11.8 | 12.7 | 12.01 | 625 | 0/200 | good |
| Example 2 | −0.8 | −10.5 | 11.8 | 11.88 | 598 | 0/200 | good |
| Example 3 | −0.5 | −10.3 | 10.8 | 11.50 | 571 | 0/200 | good |
| Example 4 | 0.3 | −11.0 | 11.7 | 11.02 | 560 | 0/200 | good |
| Example 5 | 0.5 | −12.9 | 13.6 | 11.13 | 551 | 0/200 | good |
| Example 6 | 0.4 | −14.1 | 14.9 | 10.94 | 534 | 0/200 | good |
| Example 7 | 0.8 | −15.4 | 17.2 | 10.25 | 508 | 0/200 | poor |
| Example 8 | 1.2 | −16.7 | 19.1 | 9.87 | 483 | 3/200 | poor |
| Comparative Example | −15.8 | 1.3 | 17.2 | 13.42 | 688 | 0/200 | -- |

Notes to Table 2.
ΔC-55/C25 is the comparison between electrostatic capacities at −55° C. and 25° C. (standard).
ΔC-125/C25 is the comparison between electrostatic capacities at −125° C. and 25° C. (standard).
|ΔC/C25|$_{max}$ is the maximum change in electrostatic capacitance (compared with the standard at 25° C.) that occurs in the range from −55° C. to 125° C. log IR is the insulation resistance measured after charging at 10V for 120 seconds.
BDV (dielectric breakdown voltage) is the voltage at which dielectric breakdown occurs at 25° C. when voltage is raised at a rate of 100 V/s. The results of the high-temperature load test are expressed in terms of the number of samples suffering shortcircuiting between internal electrodes 3a, 3b upon abrupt application of 100V at 150° C.

It is noted from Table 2 that samples with a ratio of $L_2/L_1$, greater than 30% (as in Examples 7 and 8) are subject to a significantly greater change in electrostatic capacitance with temperature, a decrease in insulation resistance, and deterioration after the high-temperature load test. In other words, it is necessary to control the duration of firing so that the distance ($L_2$) of nickel diffusion is 3–30% of the interval ($L_1$) between the internal electrodes 3a, 3b.

In the case where the interval ($L_1$) between the internal electrodes 3a, 3b is smaller than, say, 6 μm, the distance ($L_2$) of nickel diffusion should preferably be 3–10% of $L_1$ (most desirably 4–10% of $L_1$) for satisfactory insulation resistance.

In this way it is possible to obtain a highly reliable multilayered capacitor which changes little with temperature in electrostatic capacitance and decreases little in insulation resistance.

The multilayered electronic element of the present invention is not restricted to the above-mentioned embodiment. Various changes and modifications may be made in the invention without departing from the spirit and scope thereof. The electronic element may include inductors as well as capacitors. The ceramics used for the electronic element may include PbO-based ceramics as well as barium titanate. The material for the internal electrode may include copper as well as nickel.

The multilayered electronic element embodying the present invention is produced by firing under specific conditions (such as temperature, duration, and atmosphere) so that the material of the internal electrodes diffuses over a limited distance which is 3–30% of the interval between the internal electrodes. Controlling the effect of diffusion in this way contributes to the multilayered capacitor having only a small change in capacitance with respect to temperature, a small decrease in insulation resistance, and high reliability in the high-temperature load test.

What is claimed is:

1. A multilayered electronic element comprising:
   a ceramic body;
   a plurality of internal electrodes arranged in the ceramic body separated by ceramic layers;
   the internal electrodes being made of a base metal and the base metal being diffused into the ceramic layers such that a distance of diffusion is 3–30% of an interval between the internal electrodes.

2. A multilayered electronic element as in claim 1, wherein the interval between the internal electrodes is less than about 10 μm.

3. A multilayered electronic element as in claim 1, wherein the interval between the internal electrodes is less than 6 μm and the distance of diffusion is 3–10% of the interval between the internal electrodes.

4. A multilayered electronic element as in claim 3, wherein the distance of diffusion is 4–10% of the interval between the internal electrodes.

5. A multilayered electronic element as in claim 1, wherein the multilayered electronic element is a multilayered capacitor and the interval between the internal electrodes and the distance of diffusion are selected to provide a predetermined electrostatic capacitance and a predetermined change of electrostatic capacitance with respect to temperature.

6. A multilayered electronic element as in claim 5, wherein the interval between the internal electrodes and the distance of diffusion are selected to provide a predetermined change in insulation resistance with respect to temperature and predetermined high-temperature load characteristics.

7. A method of manufacturing a multilayered electronic element having predetermined electrical characteristics comprising the steps of:
   forming a ceramic body;
   arranging in the ceramic body a plurality of internal electrodes made of a base metal and separated by ceramic layers;
   diffusing the base metal into the ceramic layers such that a distance of diffusion is 3–30% of an interval between the internal electrodes.

8. A method of manufacturing a multilayered electronic element as in claim 7, wherein the internal electrodes are arranged such that the interval between them is less than about 10 μm.

9. A method of manufacturing a multilayered electronic element as in claim 7, wherein the internal electrodes are arranged such that the interval between them is less than 6 μm and wherein the distance of diffusion is 3–10% of the interval between the internal electrodes.

10. A method of manufacturing a multilayered electronic element as in claim 9, wherein the distance of diffusion is 4–10% of the interval between the internal electrodes.

11. A method of manufacturing a multilayered electronic element as in claim 7, wherein the multilayered electronic element is a multilayered capacitor, and further comprising the step of selecting the interval between the internal electrodes and the distance of diffusion so as to provide a predetermined electrostatic capacitance and a predetermined change of electrostatic capacitance with respect to temperature.

12. A method of manufacturing a multilayered electronic element as in claim 11, further comprising the step of selecting the interval between the internal electrodes and the distance of diffusion so as to provide a predetermined change in insulation resistance with respect to temperature and predetermined high-temperature load characteristics.

13. A method of manufacturing a multilayered electronic element as claimed in claim 12, wherein said base metal is nickel.

14. A method of manufacturing a multilayered electronic element as claimed in claim 9, wherein said base metal is nickel.

15. A method of manufacturing a multilayered electronic element as claimed in claim 7, wherein said base metal is nickel.

16. A multilayered electronic element as claimed in claim 6, wherein said base metal is nickel.

17. A multilayered electronic element as claimed in claims 3, wherein said base metal is nickel.

18. A multilayered electronic element as claimed in claims 1, wherein said base metal is nickel.

* * * * *